United States Patent
Sathyanarayana et al.

(10) Patent No.: US 11,880,458 B2
(45) Date of Patent: *Jan. 23, 2024

(54) MALWARE DETECTION BASED ON USER INTERACTIONS

(71) Applicant: Juniper Networks, Inc., Sunnyvale, CA (US)

(72) Inventors: Krishna Sathyanarayana, Bangalore (IN); Anoop Wilbur Saldanha, Bangalore (IN); Abhijit Mohanta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/448,368

(22) Filed: Sep. 22, 2021

(65) Prior Publication Data

US 2022/0004632 A1 Jan. 6, 2022

Related U.S. Application Data

(63) Continuation of application No. 16/102,335, filed on Aug. 13, 2018, now Pat. No. 11,138,313.

(51) Int. Cl.
*G06F 21/56* (2013.01)
*G06F 16/14* (2019.01)
(Continued)

(52) U.S. Cl.
CPC ............ *G06F 21/565* (2013.01); *G06F 16/14* (2019.01); *G06F 21/53* (2013.01); *G06F 21/554* (2013.01);
(Continued)

(58) Field of Classification Search
CPC ........ G06F 21/565; G06F 16/14; G06F 21/53; G06F 21/554; G06F 2221/2133;
(Continued)

(56) References Cited

U.S. PATENT DOCUMENTS 7,456,832 B1  11/2008  Fabbio et al.
7,689,532 B1   3/2010  Levy
(Continued)

FOREIGN PATENT DOCUMENTS

CN    105095760 A   11/2015
EP      3211558 A1   8/2017
WO  2016109283 A1   7/2016

OTHER PUBLICATIONS

N. Miramirkhani, M. P. Appini, N. Nikiforakis and M. Polychronakis, "Spotless Sandboxes: Evading Malware Analysis Systems Using Wear-and-Tear Artifacts," 2017 IEEE Symposium on Security and Privacy (SP), San Jose, CA, USA, 2017, pp. 1009-1024 (Year: 2017).*

(Continued)

*Primary Examiner* — Farid Homayounmehr
*Assistant Examiner* — Zhimei Zhu
(74) *Attorney, Agent, or Firm* — Harrity & Harrity, LLP

(57) ABSTRACT

A device may receive a file that has been downloaded, or is to be downloaded, to a user device, and that is to be subject to a malware detection procedure. The device may obtain, based on one or more file identification properties of the file, metadata identifying user interactions associated with the file. The metadata may include a first group of user interactions performed when the file was accessed on the user device or a second group of user interactions performed when the file was accessed on one or more other user devices. The device may test the file in a sandbox environment to obtain a result by performing the user interactions identified by the metadata and executing the malware detection procedure to determine whether the file is malware. The device may provide a notification to cause the user device to perform actions when the file is malware.

20 Claims, 10 Drawing Sheets

(51) Int. Cl.
*G06F 21/53* (2013.01)
*G06F 21/55* (2013.01)
*H04L 67/50* (2022.01)
*H04L 9/40* (2022.01)
*H04L 67/06* (2022.01)

(52) U.S. Cl.
CPC ........ *G06F 21/566* (2013.01); *H04L 63/1491* (2013.01); *H04L 67/535* (2022.05); *G06F 2221/2133* (2013.01); *H04L 67/06* (2013.01)

(58) Field of Classification Search
CPC ............. G06F 21/566; G06F 2221/033; H04L 67/535; H04L 67/06
See application file for complete search history.

(56) References Cited

U.S. PATENT DOCUMENTS

| | | | |
|---|---|---|---|
| 8,806,647 B1 | 8/2014 | Daswani et al. | |
| 8,863,288 B1 | 10/2014 | Savage et al. | |
| 9,104,867 B1 | 8/2015 | Thioux et al. | |
| 9,383,934 B1 | 7/2016 | Lukacs et al. | |
| 9,413,774 B1 | 8/2016 | Liu et al. | |
| 9,438,613 B1 | 9/2016 | Paithane et al. | |
| 9,483,644 B1 | 11/2016 | Paithane et al. | |
| 9,813,443 B1* | 11/2017 | Subramanian ........ | G06F 21/561 |
| 9,838,417 B1 | 12/2017 | Khalid et al. | |
| 9,894,096 B1* | 2/2018 | Daswani ........... | H04M 1/72403 |
| 9,912,698 B1* | 3/2018 | Thioux ................ | G06F 21/566 |
| 10,009,370 B1 | 6/2018 | Douglas et al. | |
| 10,133,866 B1 | 11/2018 | Kumar et al. | |
| 10,275,596 B1 | 4/2019 | Gupta | |
| 10,341,365 B1 | 7/2019 | Ha | |
| 10,366,226 B2 | 7/2019 | Lee et al. | |
| 10,417,031 B2 | 9/2019 | Paithane et al. | |
| 10,523,609 B1 | 12/2019 | Subramanian | |
| 10,528,734 B2* | 1/2020 | Keppler ................ | G06F 21/552 |
| 10,552,610 B1 | 2/2020 | Vashisht et al. | |
| 10,565,378 B1 | 2/2020 | Vincent et al. | |
| 10,581,879 B1 | 3/2020 | Paithane et al. | |
| 10,601,865 B1 | 3/2020 | Mesdaq et al. | |
| 10,747,881 B1 | 8/2020 | Luo et al. | |
| 10,798,121 B1* | 10/2020 | Khalid ................. | G06F 21/566 |
| 11,138,313 B2 | 10/2021 | Sathyanarayana et al. | |
| 2008/0183680 A1 | 7/2008 | Meynier et al. | |
| 2009/0144823 A1* | 6/2009 | Lamastra ................ | H04L 51/58 726/22 |
| 2009/0241187 A1 | 9/2009 | Troyansky | |
| 2010/0077483 A1 | 3/2010 | Stolfo et al. | |
| 2010/0162395 A1 | 6/2010 | Kennedy et al. | |
| 2011/0167494 A1 | 7/2011 | Bowen et al. | |
| 2011/0185423 A1 | 7/2011 | Sallam | |
| 2013/0097706 A1 | 4/2013 | Titonis et al. | |
| 2013/0275579 A1* | 10/2013 | Hernandez .......... | H04L 41/5061 709/224 |
| 2014/0380474 A1 | 12/2014 | Paithane et al. | |
| 2015/0074810 A1 | 3/2015 | Saher et al. | |
| 2015/0301926 A1 | 10/2015 | Giannelos | |
| 2016/0092682 A1 | 3/2016 | Adams et al. | |
| 2016/0292420 A1 | 10/2016 | Langton et al. | |
| 2016/0330215 A1 | 11/2016 | Gafni et al. | |
| 2017/0024561 A1 | 1/2017 | Hajmasan et al. | |
| 2017/0177867 A1 | 6/2017 | Crofton et al. | |
| 2017/0180394 A1 | 6/2017 | Crofton et al. | |
| 2017/0243000 A1 | 8/2017 | Shraim et al. | |
| 2017/0277891 A1* | 9/2017 | Keppler ............. | H04L 63/1491 |
| 2018/0213002 A1 | 7/2018 | Figovsky et al. | |
| 2018/0241819 A1 | 8/2018 | Huselton et al. | |
| 2018/0278674 A1 | 9/2018 | Zhou | |
| 2019/0020673 A1 | 1/2019 | Weinstein et al. | |
| 2019/0028494 A1 | 1/2019 | Mizrachi et al. | |
| 2019/0311132 A1* | 10/2019 | Arnoth ................... | G06F 21/53 |
| 2020/0004963 A1 | 1/2020 | Zheng et al. | |
| 2020/0110878 A1 | 4/2020 | Hu et al. | |
| 2020/0310952 A1 | 10/2020 | Shani et al. | |

OTHER PUBLICATIONS

M. Mehra and D. Pandey, "Event triggered malware: A new challenge to sandboxing," 2015 Annual IEEE India Conference (INDICON), New Delhi, India, 2015, pp. 1-6 (Year: 2015).*

Borders K., et al., "Siren: Catching Evasive Malware (Short Paper)," Proceedings of the 2006 IEEE Symposium on Security and Privacy, 2006, pp. 78-85.

Chandrasekaran M., et al., "SpyCon: Emulating User Activities to Detect Evasive Spyware," 2007 IEEE International Performance, 2007, pp. 502-509.

Extended European Search Report for Application No. EP19165995.2, dated Oct. 11, 2019, 11 pages.

Keragala D., "Detecting Malware and Sandbox Evasion Techniques," SANS Institute, 2016, pp. 1-26. [Retrieved on Feb. 18, 2021] Retrieved from the Internet [https://www.sans.org/reading-room/whitepapers/forensics/detecting-malware-sandbox-evasion-techniques-36667].

Extended European Search Report for Application No. EP22217429.4, dated Apr. 21, 2023, 9 pages.

* cited by examiner

400 ──▶

410 — Receive a file that has been downloaded to a first user device or that is to be downloaded to the first user device, wherein the file is to be subject to a malware detection procedure

420 — Process the file to determine one or more file identification properties

430 — Obtain metadata identifying user interactions associated with the file based on the one or more file identification properties, wherein the user interactions include at least one of: a first group of user interactions that were performed when the file was accessed on the first user device, or a second group of user interactions that were performed when the file was accessed on one or more other user devices

440 — Test the file in a sandbox environment to obtain a result, wherein the one or more processors, when testing the file, are to: perform the user interactions that are identified by the metadata, and execute the malware detection procedure to determine whether the file is malware

450 — Provide a notification that includes the result to the first user device to cause the first user device to perform one or more actions when the file is malware

FIG. 4

MALWARE DETECTION BASED ON USER INTERACTIONS

RELATED APPLICATION

This application is a continuation of U.S. patent application Ser. No. 16/102,335, filed Aug. 13, 2018 (now U.S. Pat. No. 11,138,313), which is incorporated herein by reference in its entirety.

BACKGROUND

Malware may refer to any software intentionally designed to cause damage to a computer, a server, a network, and/or the like. To prevent, detect, and/or remove malware, an organization may protect devices by equipping the devices with firewall software, malware detection and/or removal software, and/or the like.

SUMMARY

According to some possible implementations, a device may include one or more memories, and one or more processors, communicatively coupled to the one or more memories, to receive a file that has been downloaded to a first user device or that is to be downloaded to the first user device, wherein the file is to be subject to a malware detection procedure. The one or more processors may process the file to determine one or more file identification properties. The one or more processors may obtain metadata identifying user interactions associated with the file based on the one or more file identification properties, wherein the user interactions include at least one of: a first group of user interactions that were performed when the file was accessed on the first user device, or a second group of user interactions that were performed when the file was accessed on one or more other user devices. The one or more processors may test the file in a sandbox environment to obtain a result, wherein the one or more processors, when testing the file, are to perform the user interactions that are identified by the metadata, and are to execute the malware detection procedure to determine whether the file is malware. The one or more processors may provide a notification that includes the result to the first user device to cause the first user device to perform one or more actions when the file is malware.

According to some possible implementations, a method may include receiving, by a device, a file that has been downloaded to a first user device or that is to be downloaded to the first user device. The method may include processing, by the device, the file to determine one or more file identification properties. The method may include obtaining, by the device and based on the one or more file identification properties, metadata identifying user interactions associated with the file that include at least one of: a first group of user interactions that were performed when the file was accessed on the first user device, or a second group of user interactions that were performed when the file was accessed on one or more other user devices. The method may include performing, by the device and within a sandbox environment, the user interactions identified by the metadata. The method may include executing, by the device and within the sandbox environment, a malware detection procedure to determine whether the file is malware, wherein the user interactions are performed to reduce or eliminate a likelihood of a malware defense mechanism triggering benign malware behavior prior to execution of the malware detection procedure. The method may include providing, by the device and to the first user device, a notification indicating whether the file is malware to cause the first user device to perform one or more actions when the file is malware.

According to some possible implementations, a non-transitory computer-readable medium may store instructions that include one or more instructions that, when executed by one or more processors of a user device, cause the one or more processors to receive a file that is to be accessed on the user device. The one or more instructions may cause the one or more processors to process the file to determine a file identifier. The one or more instructions may cause the one or more processors to capture user interactions with one or more interface objects, associated with the file, that are displayed after the file is accessed. The one or more instructions may cause the one or more processors to generate metadata identifying the user interactions with the one or more interface objects associated with the file. The one or more instructions may cause the one or more processors to provide the file identifier and the metadata to a data structure accessible by a security platform to permit the security platform to test the file in a sandbox environment to determine whether the file is malware. The one or more instructions may cause the one or more processors to receive, from the security platform, a notification indicating whether the file is malware. The one or more instructions may cause the one or more processors to perform one or more actions to undo a set of modifications to the user device that were caused by the malware based on receiving the notification and the notification indicating that the file is malware.

BRIEF DESCRIPTION OF THE DRAWINGS

FIGS. 4-6 are flow charts of an example processes for detecting malware based on user interactions associated with processes of a file.

DETAILED DESCRIPTION

Figure 1A:
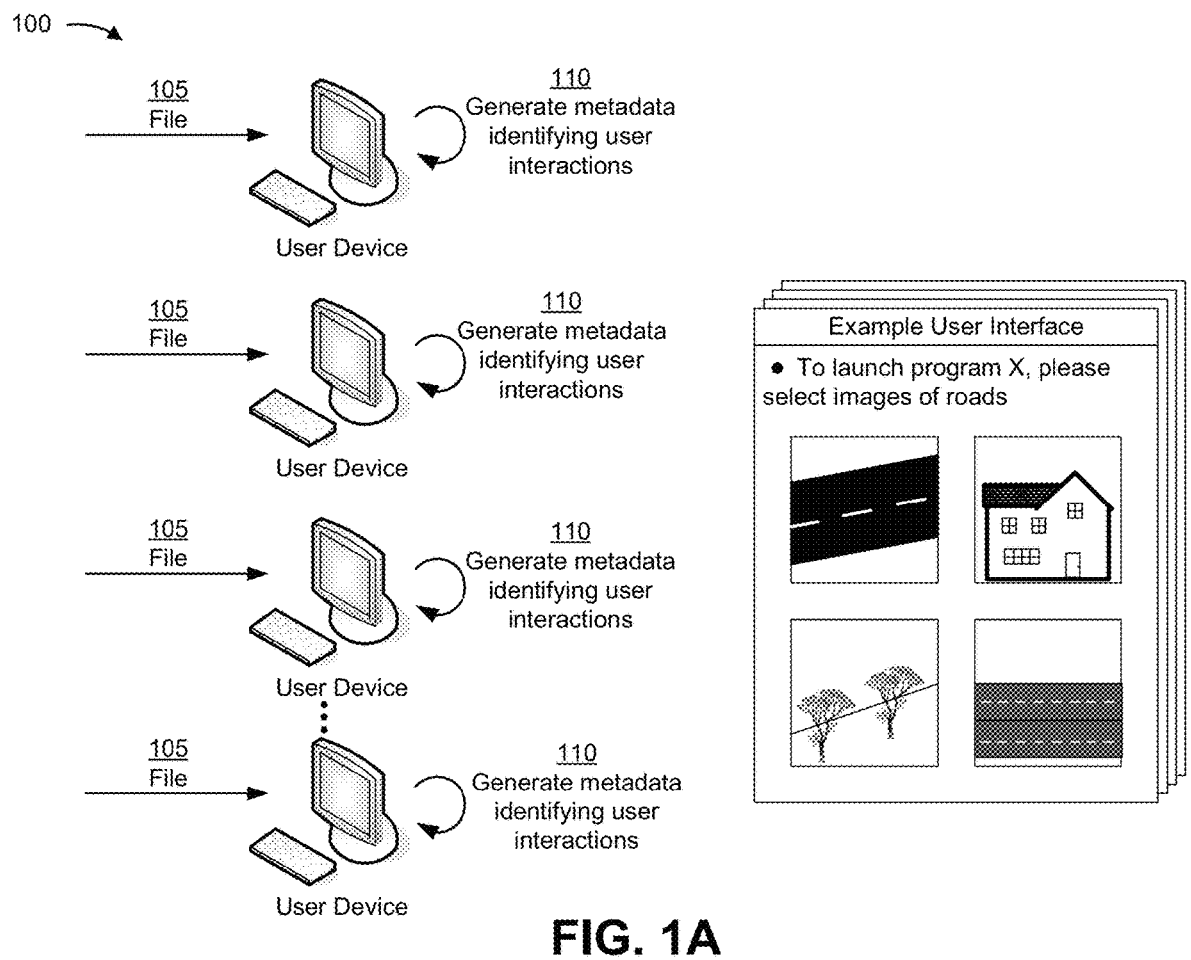
FIGS. 1A-1E are diagrams of an example implementation described herein.

The following detailed description of example implementations refers to the accompanying drawings. The same reference numbers in different drawings may identify the same or similar elements.

To prevent and/or detect malware, an organization may protect devices by equipping the devices with firewall software, malware detection and/or removal software, and/or the like. For example, an organization may deploy a sandbox environment with one or more malware detection techniques that are able to detect whether a file is malware.

However, malware may be equipped with various defense mechanisms that make the malware difficult to detect and eliminate. For example, the malware may be equipped with a defense mechanism that identifies whether the malware is being accessed by a human user or by a sandbox environment that is capable of detecting the malware.

As an example, if a user interacts with a user device to download and/or access a file that is malware, the malware may ask the user for input, such as by requiring the user to interact with one or more dialogue boxes that are presented for display on an interface of the user device (e.g., a user may interact with a dialogue box by selecting yes or no, by answering a question, by selecting a subset of a displayed list of menu options, and/or the like). In this example, if responses input to the dialogue box resemble a machine and not a human user, the malware may trigger a defense mechanism that causes the malware to exhibit benign behavior. By exhibiting benign behavior and masquerading itself as clean software, malware detection techniques used in the sandbox environment may be unable to detect the malware.

Furthermore, large variances of possible actions may be performed within dialogue boxes and malware creators may consistently release new variances and tricks for verifying whether a user is a human user. As such, deploying a machine learning model in a sandbox environment to predict user responses may be an ineffective solution.

Some implementations described herein provide a security platform to determine whether a file is malware by simulating user interactions associated with processes of the file to overcome a malware defense mechanism, thereby allowing execution of a malware detection procedure to determine whether the file is malware. For example, the security platform may receive a file that is to undergo a test to determine whether the file is malware. In this case, the security platform may obtain metadata identifying user interactions, associated with processes of the file, that were performed in connection with the file when the file was accessed on a user device. Additionally, the security platform may test the file in a sandbox environment by performing the user interactions identified by the metadata and by executing a malware detection procedure to determine whether the file is malware. Furthermore, the security platform may provide a notification to a user device indicating whether the file is malware. If the file is malware, the user device may perform one or more actions to undue a set of modifications that the malware made to the user device.

In this way, the security platform determines whether files are malware, despite the malware deploying defense mechanisms capable of detecting whether the malware is being accessed by a human user or a sandbox environment. By preventing or reducing malware attacks on devices within a network, the security platform reduces a utilization of processing resources of devices targeted by malware (e.g., resources that may be used to perform unauthorized actions, receive unauthorized data, store unauthorized data, transmit unauthorized data, and/or the like). This improves overall performance of the devices by freeing up resources that might otherwise be used to perform unauthorized actions dictated by the malware. Furthermore, by detecting the malware, the security platform conserves processing resources and/or network resources that would otherwise be used to perform actions needed to undo modifications caused by the malware.

Additionally, or alternatively, some implementations described herein provide a user device to capture user interactions with one or more interface objects associated with processes of a file, to provide metadata identifying the user interactions to a security platform to permit the security platform to determine whether the file is malware, and to perform actions to undo a set of modifications to the user device if the file is identified as malware. For example, the user device may capture the user interactions with one or more interface objects, associated with the file, that are displayed after the file is accessed. In this case, the user device may provide the metadata identifying the user device to a data storage, which may allow the security platform to test the file in a sandbox environment to determine whether the file is malware. Additionally, the user device may receive a notification indicating whether the file is malware, and may perform one or more actions to undo modifications to the user device that were caused by the malware.

In this way, the user device captures user interactions needed to determine whether the file is malware, thereby preventing or reducing malware attacks on the user device. This reduces a utilization of processing resources of the user device that might otherwise be expended performing unauthorized actions, receiving unauthorized data, storing unauthorized data, transmitting unauthorized data, and/or the like. Furthermore, by tracking state information, the user device is able to undo the set of modifications made by the malware. This reduces a utilization of resources that was previously being used to support malware-related actions, improves user device performance by freeing up resources for authorized tasks, and/or the like.

FIGS. 1A-1E are diagrams of an example implementation 100 described herein. Example implementation 100 may include a group of user devices that are associated with an organization (or two or more organizations), that are associated with a network (or two or more networks), and/or the like, a data storage, and a security platform for providing services relating to network security. As shown, the security platform may determine whether files are malware by using metadata obtained from the group of user devices to simulate user interactions associated with the files. This may allow the security platform to execute a malware detection procedure on the files (e.g., in a sandbox environment), without the files activating a malware defense mechanism that would otherwise prevent the malware detection procedure from detecting the malware, as described in further detail herein. As used herein, a file may include an executable file (e.g., a program and/or the like) or a non-executable file (e.g., a word processing document, a spreadsheet document, a portable document format (PDF) document, and/or the like).

As shown in FIG. 1A, and by reference number 105, the group of user devices may periodically receive files. For example, one or more teams of employees of the organization may use the group of user devices to perform a number of different tasks as part of jobs within the organization. Over time, files may be downloaded to and/or installed to the group of user devices (e.g., to assist a user in performing a job-related task, or, in some cases, a file may be downloaded for another purpose or accidently).

In some implementations, a file may be downloaded directly to a user device. For example, the file may be downloaded from a website, via a link in an e-mail, and/or the like. Additionally, or alternatively, when a file is to be downloaded to the user device (e.g., while on a network of the organization), the file may first be routed or intercepted by one or more intermediary devices, such as a switched port analyzer (SPAN), a network sensor, a network gateway, the security platform, and/or the like. As an example, an intermediary device may monitor network traffic (e.g., incoming files), and may provide the network traffic or a copy of the network traffic to the security platform for further analysis.

In some implementations, the intermediary device may forward the network traffic or a copy of the network traffic to the security platform before sending the network traffic to one or more user devices. In some implementations, the intermediary device may forward the network traffic or a copy of the network traffic to the security platform after sending the network traffic to one or more user devices. In some implementations, the intermediary device may forward the network traffic or a copy of the network traffic to the security platform concurrently with sending the network traffic to one or more user devices.

As shown by reference number 110, the group of user devices may generate metadata identifying user interactions associated with processes of the files. For example, a user device may capture display information for a set of interface objects that are displayed as part of the processes of the files, may capture user interactions with the set of interface objects, and may generate metadata identifying the display information and/or the user interactions, as described in further detail herein.

In some implementations, when a user device downloads a file, executes the file, and/or interacts with processes of the file, the file may trigger display of a set of user interface objects that may be viewed by a user. If the file is malware, the set of user interface objects may include dialogue boxes that are used to verify that the user is a human user (e.g., and not a machine attempting to detect that the file is malware). In this case, to verify whether the user is a human user, the group of dialogue boxes may ask the user to select yes or no to a question presented, to select a response to the question presented from a menu of choices, to ask the user to input a response to the question presented (e.g., by using a keyboard to input a response), by asking the user to select particular objects on a screen (as shown in FIG. 1A by asking the user to select images that include roads), by asking the user to select particular colors displayed on the screen, and/or the like.

In some implementations, the user device may install an agent program that is capable of capturing user interactions associated with processes of the files. For example, to take advantage of the services provided by the security platform, a user may install, onto the user device, an agent program that includes features for capturing display information for the set of interface objects associated with the file, capturing the set of user interactions with the set of interface objects associated with the file, and/or the like. The agent program may be installed as part of a user-space portion of the user device or as part of a kernel-space portion of the user device.

In some implementations, the user device may capture display information for a set of interface objects that are displayed as part of processes of a file. For example, the user device may capture the display information by using an image capturing technique, an interface scraping technique, and/or the like. The image capturing technique may take periodic screenshots of the user interface, record a video of the user interface, and/or the like. If the image capturing technique takes periodic screenshots, image files may be created that include display information for the set of interface objects, display information for other aspects of the user interface (e.g., aspects not displayed by the file), and/or the like. If the image capturing technique records a video, a media file may be created that includes a set of frames with the display information.

In some implementations, the user device may be able to identify the set of interface objects over other interface objects that are not associated with processes of the file. For example, the user device may take a first screenshot prior to execution of the processes of the file and may take a second screenshot after the execution of the processes of the file. As such, the user device may analyze the first screenshot and the second screenshot to identify which interface objects are associated with the processes of the file.

In some cases, the user device may immediately discard (e.g., delete) display information that is unrelated to the processes of the file. For example, if the user device receives a pop-up that is malware, while on an online banking webpage, the user device would discard any display information unrelated to the popup (e.g., confidential bank information that may have appeared on the user interface). In this way, the user device captures display information relating to the processes of the file, without jeopardizing data privacy of users, while remaining in compliance with data privacy laws and/or similar laws. Furthermore, this allows the user device to conserve processing resources and/or network resources that might otherwise be used to generate metadata for display information that is unrelated to the file.

In some implementations, the user device may capture user interactions associated with the processes of the file. For example, the user device may capture user interactions using the image capturing technique, the interface scraping technique, and/or the like. In this case, the user device may differentiate between the user interactions and the display information by comparing screenshots at particular time periods, in a similar manner to that described above. For example, a series of screenshots over a period of a few seconds may indicate that the mouse icon is moving toward a particular button displayed on the user interface and may include a display action showing the button being clicked. This allows the user device to capture user interactions which may be used to generate the metadata, as described herein.

It is to be understood that the above techniques for capturing display information and user interactions are provided by way of example. In practice, the user devices may use any number of different techniques, such as a technique used by an agent program that is installed at a kernel-level part of the user device (e.g., that may be capable of capturing data without needing an image capturing or interface scraping technique).

In some implementations, a user device may selectively capture user interactions with the set of interface objects. For example, the user device may scan a file to identify that the file is safe, which may allow the user device to forgo capturing display information and user interactions with interface objects. In this case, the user device may be provided with a safe list of webpages, files, devices, and/or the like (often referred to as a white list), and may perform high-level processing of the file (e.g., to identify a sender of the file, a file name, and/or the like) to determine whether to capture the display information and the user interactions. In this way, the user device conserves processing resources and/or network resources relative to always capturing user interactions when a file is accessed on the user device.

In some implementations, the user device may generate metadata for the set of interface objects. For example, the image capturing technique may have created an image file or a media file, and the user device may use one or more natural language processing techniques and/or one or more computer vision techniques to process the image file or the media file to generate the metadata identifying the set of interface objects. The metadata identifying the set of interface objects may include data identifying that an interface object is a depiction of a person, a place, a thing (e.g., a question being asked), and/or the like, data identifying a characteristic of the interface object (e.g., a color, a size, a shape, etc.), and/or the like.

In some implementations, the user device may determine a file identifier for the file. For example, the user device may process the file to determine a file identifier (e.g., a file name, a hash of a file name, and/or the like) that may be used by the security platform to obtain the metadata identifying the user interactions associated with the file, as described further herein.

In this way, the group of user devices are able to capture user interactions associated with files.

Figure 1B:
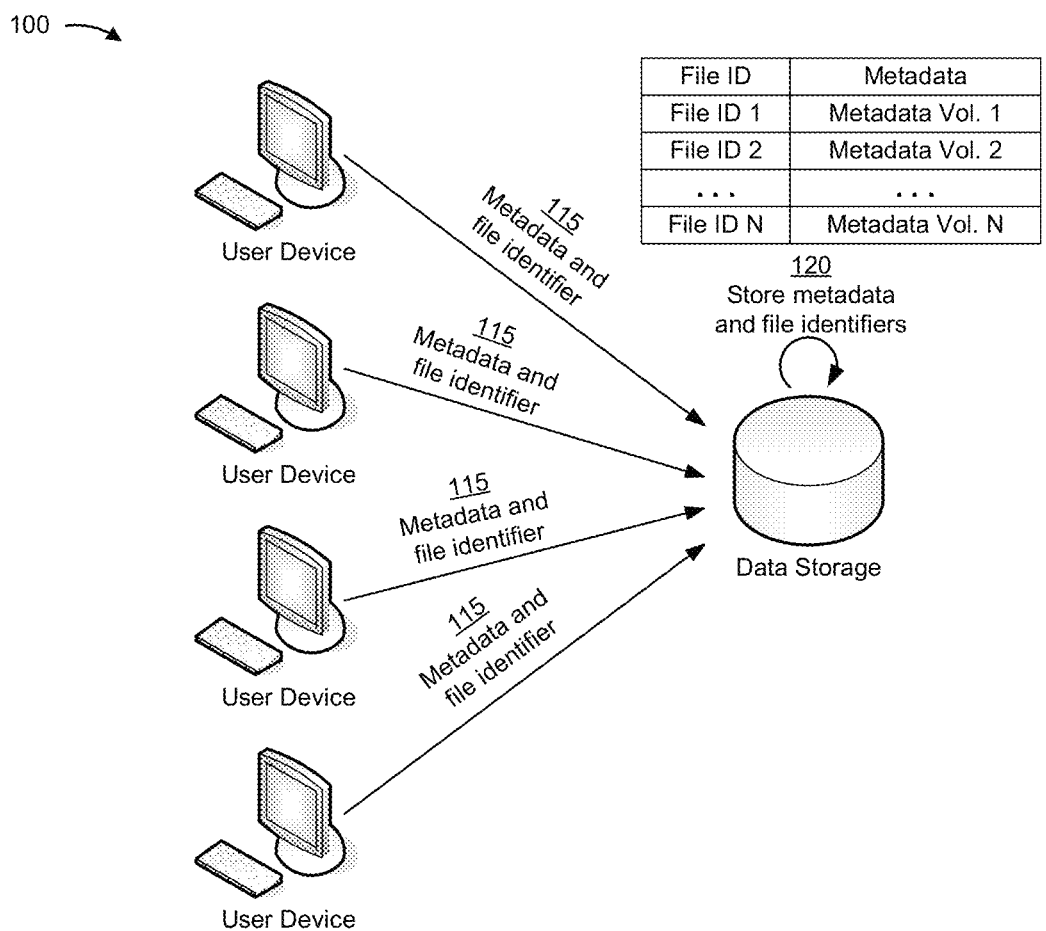

As shown in FIG. 1B, and by reference number 115, the group of user devices may provide the metadata (e.g., the metadata identifying the user interactions and/or the metadata identifying the display information) and the file identifiers to the data storage. For example, the group of user devices may use a communication interface (e.g., an application programming interface or a similar type of interface) to provide the metadata and the file identifiers for the files to the data storage.

In some implementations, one or more other devices may receive the metadata and/or the file identifiers. For example, a user device may provide metadata associated with a file and/or a corresponding file identifier to the security platform.

As shown by reference number 120, the data storage may store the metadata and file identifiers provided by the group of user devices. In some implementations, the data storage may use a data structure to store the metadata and the file identifiers, such as an array, a linked-list, a hash table, a database (e.g., a relational database), and/or another type of data structure.

In some implementations, the data storage may use the data structure to establish an association between the metadata and file identifiers. For example, metadata associated with a particular file may be stored in a manner that associates the metadata with the particular file's file identifier.

In this way, the data storage associates metadata and file identifiers such that the security platform is able to use a file identifier for a particular file to search the data structure for metadata corresponding to the particular file, as described further herein.

Figure 1C:
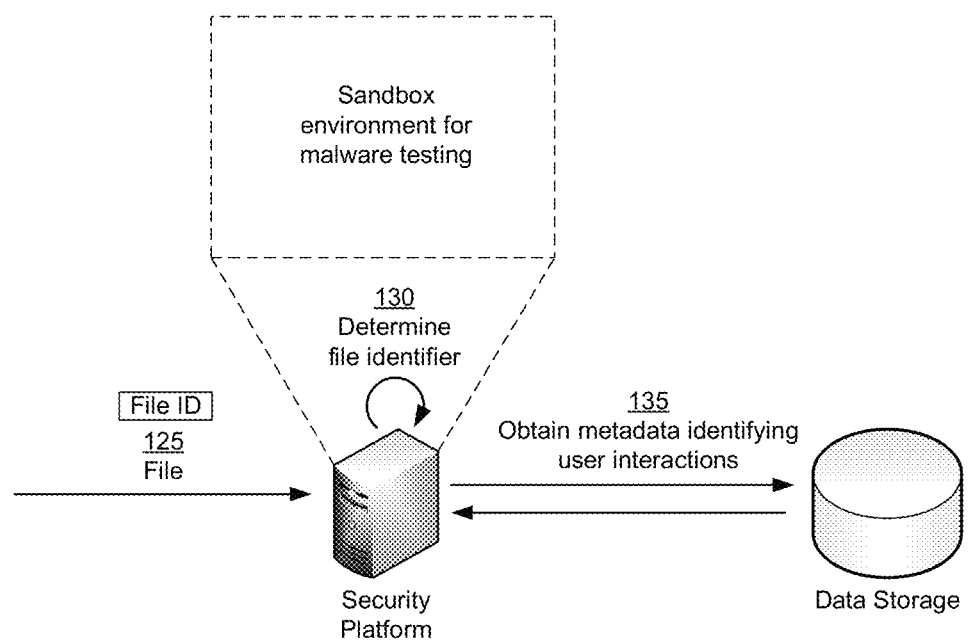

As shown in FIG. 1C, and by reference number 125, the security platform may receive a file. For example, the security platform may receive a file that had been downloaded by or that is to be downloaded by a user device included in the group of user devices. In some implementations, when the file is received at the network, an intermediary device (e.g., a SPAN, a network sensor, a network gateway, and/or the like) may create a copy of the file and provide the copy of the file to the security platform (or, may provide the file to the security platform and provide the copy of the file to the user device).

In some implementations, the security platform may receive the file after the file has been downloaded to the user device and/or after the user device has triggered the processes of the file. In some implementations, the security platform may receive the file before the file has been downloaded to the user device and/or before the user device has triggered the processes of the file.

As shown by reference number 130, the security platform may determine a file identifier for the file. For example, the security platform may process the file to determine a file identifier (e.g., may determine a file name for the file, a hash of a file name for the file, and/or the like). As shown by reference number 135, the security platform may obtain metadata identifying user interactions associated with the file. For example, the security platform may use a search query that includes the file identifier to search the data structure of the data storage for the metadata identifying user interactions. In this case, the security platform may receive a search result which, if successful, includes metadata identifying user interactions that were performed by one or more user devices that had previously downloaded or accessed the file or a same type of file.

In some implementations, the security platform may receive a search result indicating that the file identifier did not match metadata stored by the data structure. In this case, the security platform may perform a set of actions to obtain metadata identifying user interactions associated with files that have the same or similar interface objects as the set of interface objects of the file, as further described below.

In some implementations, the security platform may access the file in a sandbox environment, which may trigger display of the set of interface objects associated with the file. In this case, the security platform may capture display information using a technique described elsewhere herein. Additionally, the security platform may process the display information to generate metadata identifying the set of interface objects. Furthermore, the security platform may use a search query that includes the metadata identifying the set of interface objects to search the data structure for metadata identifying identical or similar interface objects of other files. The metadata identifying the identical or similar interface objects of the other files may be stored in association with metadata identifying user interactions with the identical or similar interface objects, which the security platform may then use while testing to determine if the file is malware.

In some implementations, the search query may allow for configurable parameters. For example, the security platform may obtain metadata identifying user interactions with interface objects of other files only if the metadata identifying interface objects for the other files satisfies a threshold level of similarity with the metadata identifying the set of interface objects of the file. This improves an ability of the security platform to accurately detect malware by using metadata that satisfies the threshold level of similarity.

In this way, the security platform obtains metadata that may be used to simulate user interactions, which may be used to pass a user verification test that may be presented by the file (e.g., which may be malware).

Figure 1D:
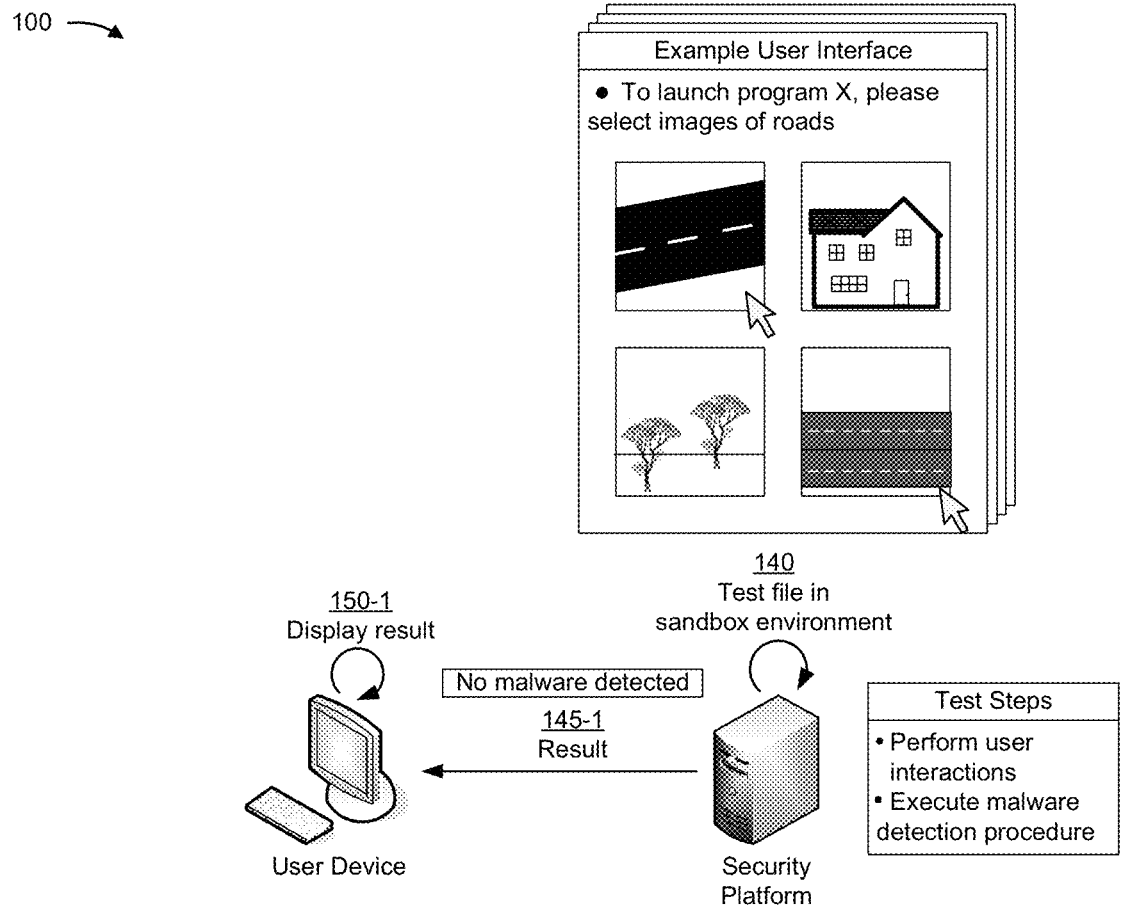

As shown in FIG. 1D, and by reference number 140, the security platform may test the file in the sandbox environment. For example, the security platform may access the file (e.g., execute the file, open the file, and/or the like), which may cause a set of interface components to be displayed as part of the human verification test. In this case, the security platform may complete the human verification test by executing a human verification procedure that performs the user interactions on the set of interface components, which may allow the security platform to execute a malware detection procedure to determine whether the file is malware.

In some implementations, the security platform may be configured with a sandbox environment that may be used to test files to determine whether the files are malware. The sandbox environment may simulate a fully functional operating system and file system used by the group of user devices. For example, the sandbox environment may be configured such that malware could access hard drives, registries, and/or the like, without the malware identifying the sandbox environment as a threat. This may allow the sandbox environment to access the file, interact with the file in a manner that is the same or similar as the user interactions performed by human users, and/or the like. Additionally, or alternatively, the sandbox environment may be configured to execute a malware detection procedure that is able to detect whether a file is malware, monitor changes the malware makes to the sandbox environment, and/or the like.

In some implementations, the security platform may simulate or perform the user interactions identified by the metadata. For example, the security platform may read the metadata values which may indicate which user interactions to perform. As shown as an example, if the metadata identifies that the user selected a first box that displays a road and a fourth box that displays a road, the security platform may perform user interactions that involve selecting the first box and the fourth box.

In some implementations, the human verification procedure may cause a sequence of interface components to be displayed. For example, the file may display a first dialogue box asking a first question and may only display one or more additional dialogue boxes if the first question is answered correctly. In this case, the security platform may read the metadata associated with a user interaction with the first dialogue box, which may allow the security platform to perform the user interaction. The security platform may then scan the set of interface components until the one or more additional dialogue boxes are detected. In this case, the security platform may again read the metadata, which may allow the security platform to perform additional user interactions with the one or more additional dialogue boxes.

In some implementations, the security platform may perform user interactions using a robotics process automation (RPA) technique or a similar technique. For example, the security platform may use an RPA technique to read the metadata and to simulate or perform the user interactions within the sandbox environment.

In some implementations, the security platform may execute a malware detection procedure. For example, the security platform may execute a malware detection procedure after completion of the human verification procedure. The malware detection procedure may include a signature-based detection technique, a heuristics-based detection technique, a behavioral detection technique, a cloud-based detection technique, and/or the like. As an example, the malware detection procedure may determine whether the file is malware by monitoring registers, ports, and/or the like, within the sandbox environment, and, if particular modifications are made while the file is being accessed, the security platform may conclude that the file is malware.

In some cases, the user interactions performed by human users on the user devices may have included erroneous actions (e.g., actions that may fail the human verification test). If the security platform performs these same user interactions, and the file is malware, the security platform may fail the human verification test, which may cause the file, if malware, to exhibit benign malware behavior. This would prevent the malware detection procedure from detecting the malware.

To combat this, prior to performing the user interactions, the security platform may determine a likelihood of the user interactions identified by the metadata causing a malware defense mechanism to exhibit benign malware behavior. For example, the security platform may process the metadata identifying the user interactions (e.g., using a set of rules, a data model trained on historical data that uses machine learning, a statistical analysis, and/or the like) to determine a likelihood of the user interactions causing the malware defense mechanism to exhibit benign malware behavior. In this case, the security platform may determine whether the likelihood satisfies a threshold likelihood of the user interactions causing the benign malware behavior. If the threshold is not satisfied, the security platform may still perform the user interactions, as described above. If the threshold is satisfied, the security platform may obtain other user interactions from the data storage (e.g., using techniques described herein), and may perform the other user interactions.

As shown by reference number 145-1, the security platform may provide a result of the malware detection procedure to the user device. For example, the malware detection procedure may determine that the file is not malware. In this case, the security platform may generate a notification indicating that the file is not malware and may provide the notification to the user device.

As shown by reference number 150-1, the user device may display the result. For example, the user device may display the result indicating that the file is not malware. In some cases, the user device may have downloaded the file, but not authorize access to the file until receiving notification that the file is not malware. In some implementations, the user device may have collected data regarding modifications to the user device caused by the file. The user device may have used this data to undo the modifications in a situation where the file has been identified as malware. When the file is identified as safe (i.e., not malware), the user device may delete this data from memory, thereby conserving memory resources that would otherwise be wasted by continuing to store the data.

In this way, the security platform tests whether the file is malware in a manner that prevents or reduces a likelihood of the file, if malware, detecting the sandbox environment and exhibiting benign malware behavior.

Figure 1E:
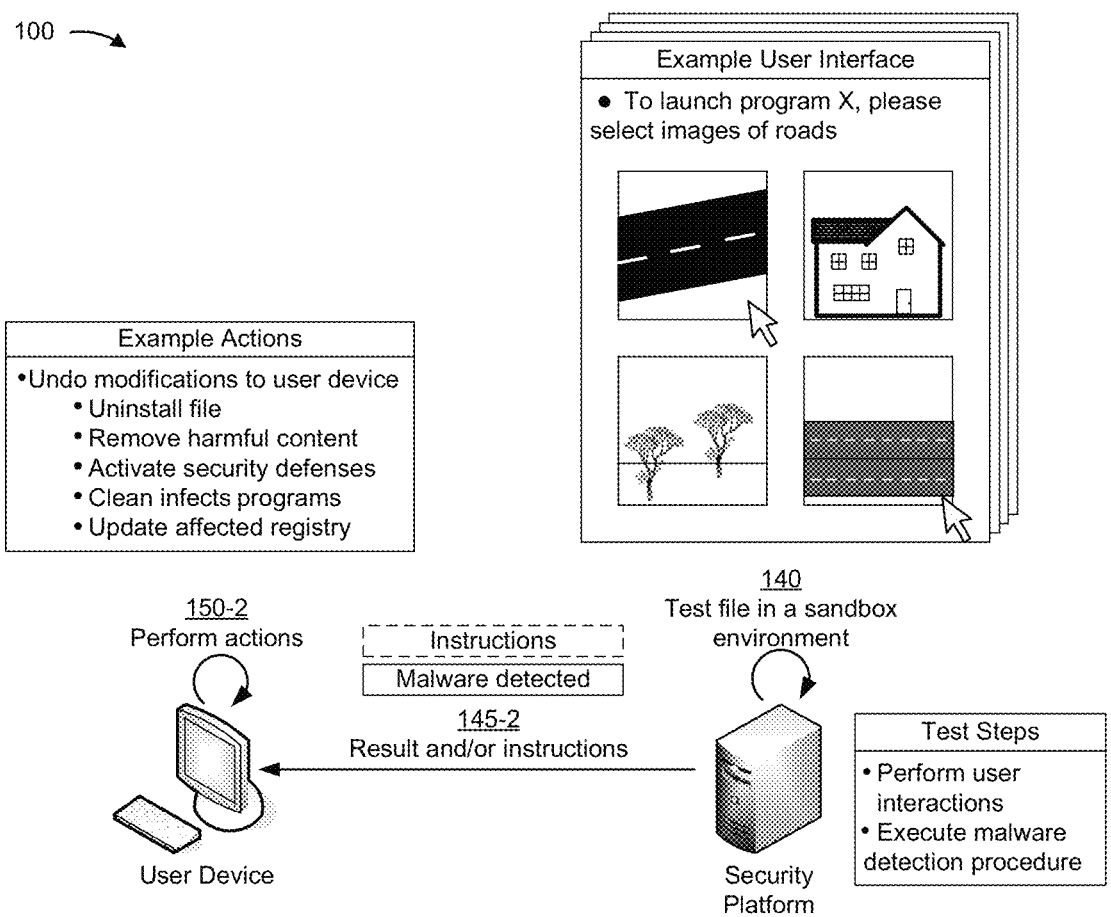

As shown in FIG. 1E, the security platform may determine that the file is malware. In this case, and as shown by reference number 145-2, the security platform may provide a result of the malware detection procedure (e.g., that the file is malware) and/or instructions to the user device. For example, the security platform may generate a notification indicating that the file is malware and may provide the notification to the user device.

In some implementations, the security platform may, as part of the notification, provide the user device with instructions associated with a set of modifications that the malware may have made to the user device. The instructions may be instructions to undo the set of modifications, instructions that indicate how to undo the set of modifications (e.g., because the set of modifications may have been observed when the security platform accessed the file in the sandbox environment), and/or the like. In some implementations, the security platform may have permission to automatically undo the set of modifications made to the user device, such as by using an API to log into the user device and performing actions that undo the set of modifications (e.g., as described below).

The set of modifications may include a first modification to change a register value, a second modification to open or close a port, a third modification to open or close a network connection, a fourth modification to add a new file or a new folder, a fifth modification to modify an existing file or an existing folder, and/or the like.

As shown by reference number 150-2, the user device may, after receiving notification that the file is malware and/or the instructions, perform one or more actions to undo the set of modifications. For example, the agent program (executing on the user device) may be used to monitor state information of the user device. The state information may include, for a particular time period, a set of register values, a port state for a set of ports (e.g., open, closed, etc.), a state for one or more network connections (e.g., open, closed, etc.), file information for a set of files (e.g., file metadata, such as file size, file name, and/or the like, file contents, etc.), folder information (e.g., indicating which files are in which folders, etc.), and/or the like.

In this case, the user device may compare state information at a first time period occurring prior to downloading and/or accessing the file and state information at a second time period occurring after receiving the notification indicating that the file is malware. In some implementations, the user device may intelligently differentiate between discrepancies caused by the file and discrepancies caused by other authorized actions performed on the user device. For example, the user device may monitor a source behind all (or some) actions performed on the user device, which may allow the user device to identify which modifications were made by the malware. In this way, the user device identifies the set of modifications made by the malware, which may allow the user device to perform actions to undo the set of modifications.

In some implementations, the security platform may perform the one or more actions. For example, the security platform may uninstall the file, remove harmful content identified as part of the set of modifications, activate additional security procedures, clean infected files and/or folders, revert registry values back to values associated with a state before the malware modifications were made, update a state of one or more ports that were modified, and/or the like.

In some implementations, the security platform may erroneously determine that a file is not malware, may identify the error, and may perform one or more actions to correct the error. For example, assume the security platform determines that a first file is not malware. In this case, the security platform may subsequently receive a second file that has been downloaded to a second user device (or that is to be downloaded to the second user device). The security platform may execute the malware detection procedure on the second file to determine that the second file is malware. Furthermore, the security platform may scan a list of file identifiers of files that were previously identified as not malware and may determine that a file identifier of the second file matches a file identifier of the first file.

As such, the security platform may obtain new metadata identifying user interactions that were used to determine that the second file is malware and may retest the first file, which may include performing the user interactions identified by the new metadata and re-executing the malware detection procedure to determine that the second file is malware. Furthermore, the security platform may provide a notification indicating that the first file is malware to the user device and may perform actions to undo modifications that were made by the malware, as described herein.

In this way, the security platform determines whether the file is malware, even if the malware deploys defense mechanisms capable of detecting whether the malware is being accessed by a human user or a sandbox environment. By preventing or reducing malware attacks on the group of user devices, the security platform reduces a utilization of processing resources of user devices targeted by malware (e.g., resources that may be used to perform unauthorized actions, receive unauthorized data, transmit unauthorized data, store unauthorized data, and/or the like). This improves overall performance of those user devices by freeing up resources that might otherwise be used to perform unauthorized actions dictated by the malware. Furthermore, some implementations detect the malware prior to the user device accessing the file, which conserves processing resources and/or network resources that would otherwise be used to perform actions needed to undo modifications caused by the malware.

As indicated above, FIGS. 1A-1E are provided merely as an example. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
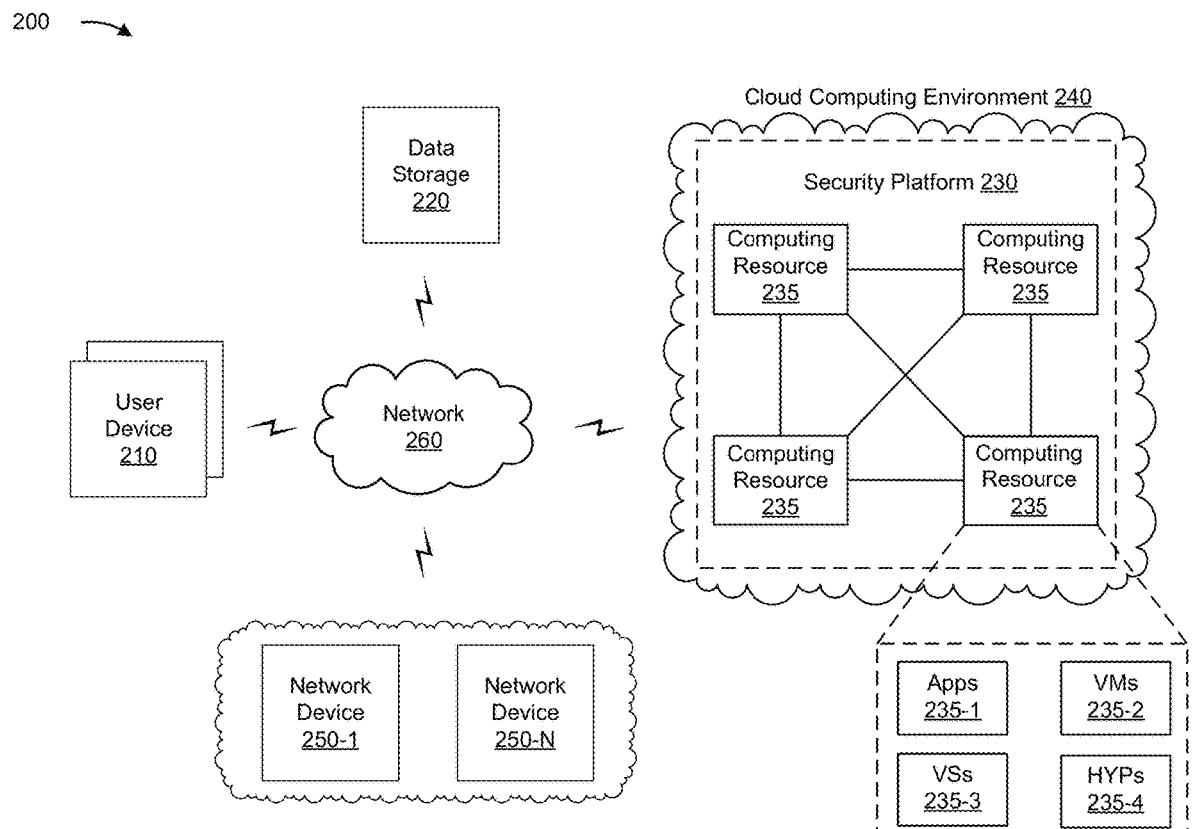
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a group of user devices 210, a data storage 220, a security platform 230 hosted within a cloud computing environment 240, a group of network devices 250 (shown as Network Device 250-1 through Network Device 250-N), and/or a network 260. Devices of environment 200 may interconnect via wired connections, wireless connections, or a combination of wired and wireless connections.

User device 210 includes one or more devices capable of receiving, generating, storing, processing, and/or providing information associated with a file. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

In some implementations, user device 210 may receive a file that is to be subject to one or more security features of security platform 230. In some implementations, user device 210 may download the file directly from a source device. In some implementations, when user device 210 downloads the file, before the file is downloaded, the file may be intercepted by one or more intermediary devices, such as a switched port analyzer (SPAN), a network sensor, a network gateway, security platform 230, and/or the like. In some implementations, user device 210 may provide metadata identifying a set of user interactions and/or a file identifier of a file to data storage 220.

Data storage 220 includes one or more devices capable of receiving, storing, generating, determining, and/or providing information associated with a file. For example, data storage 220 may include a server device or a group of server devices. In some implementations, data storage 220 may include one or more data structures that may be used to store metadata associated with a file, a file identifier of the file, and/or the like. In some implementations, data storage 220 may receive a request for metadata from security platform 230. In some implementations, data storage 220 may provide the metadata to security platform 230.

Security platform 230 includes one or more devices capable of receiving, storing, processing, generating, determining, and/or providing information associated with a file. For example, security platform 230 may include a server device (e.g., a host server, a web server, an application server, etc.), a data center device, or a similar device. In some implementations, security platform 230 may provide a notification, to user device 210, indicating whether a file is malware. In some cases, the notification may include instructions indicating to undo modifications caused by malware, instructions indicating how to undo the modifications caused by the malware, and/or the like.

In some implementations, security platform 230 may support a sandbox environment. In some implementations, security platform 230 support the sandbox environment using a physical machine. In some implementations, security platform 230 may support the sandbox environment using computing resource 235 (e.g., such as by using a virtual machine running in a hypervisor). In some implementations, security platform 230 may include an execution engine that is able to perform tests on a file. In some implementations, security platform 230 may include an execution engine that is able to perform user interactions with a set of interface components associated with the file, execute a malware detection procedure, execute a malware correction procedure, and/or the like.

In some implementations, as shown, security platform 230 may be hosted in cloud computing environment 240. Notably, while implementations described herein describe security platform 230 as being hosted in cloud computing environment 240, in some implementations, security platform 230 may not be cloud-based (i.e., may be implemented outside of a cloud computing environment) or may be partially cloud-based.

Cloud computing environment 240 includes an environment that hosts security platform 230. Cloud computing environment 240 may provide computation, software, data access, storage, etc. services that do not require end-user knowledge of a physical location and configuration of system(s) and/or device(s) that hosts security platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host security platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage 220. Application 235-1 may eliminate a need to install and execute the software applications on these devices. For example, application 235-1 may include software associated with security platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network device 250 includes one or more devices capable of receiving, processing, storing, routing, and/or providing traffic (e.g., a file, etc.) in a manner described herein. For example, network device 250 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 250 may include a gateway, a switch, a firewall, a hub, a bridge, a reverse proxy, a server (e.g., a proxy server, a cloud server, a data center server, etc.), a load balancer, and/or a similar device. In some implementations, network device 250 may be a physical device implemented within a housing, such as a chassis. In some implementations, network device 250 may be a virtual device implemented by one or more computer devices of a cloud computing environment or a data center.

In some implementations, network device 250 may serve as an intermediary device to route traffic and/or files to security platform 230. In some implementations, network device 250 may be a target for services offered by security platform 230. As such, one or more implementations and/or features described as being performed by user device 210 may be implemented by and/or performed on network device 250.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
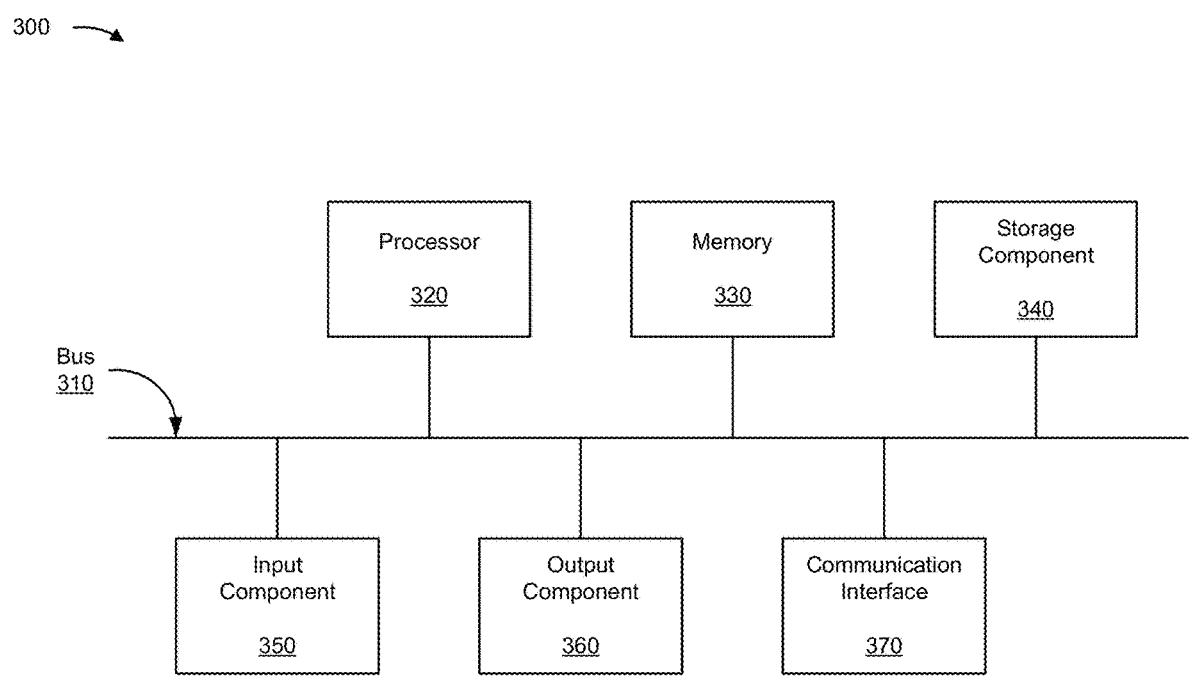
FIG. 3 is a diagram of example components of one or more devices of FIG. 2.

FIG. 3 is a diagram of example components of a device 300. Device 300 may correspond to user device 210, data storage 220, and/or security platform 230. In some implementations, user device 210, data storage 220, and/or security platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, device 300 may correspond to network device 250. In some implementations, network device 250 may include one or more devices 300 and/or one or more components of device 300. In some implementations, network device 250 may include other components, such as a set of links, a set of integrated circuits supporting a set of packet processing components, a switching fabric, a controller, and/or the like.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for detecting malware based on user interactions associated with processes of a file. In some implementations, one or more process blocks of FIG. 4 may be performed by a security platform (e.g., security platform 230). In some implementations, one or more process blocks of FIG. 4 may be performed by another device or a group of devices separate from or including the security platform, such as a user device (e.g., user device 210), a data storage (e.g., data storage 220), and/or a network device (e.g., network device 250).

As shown in FIG. 4, process 400 may include receiving a file that has been downloaded to a first user device or that is to be downloaded to the first user device, wherein the file is to be subject to a malware detection procedure (block 410). For example, the security platform (e.g., security platform 230, using computing resource 235, processor 320, memory 330, input component 350, communication interface 370, and/or the like) may receive a file that has been downloaded to a first user device (e.g., a first user device 210) or that is to be downloaded to the first user device, as described above with regard to FIGS. 1A-1E. In some implementations, the file may be subject to a malware detection procedure.

As further shown in FIG. 4, process 400 may include processing the file to determine one or more file identification properties (block 420). For example, the security platform (e.g., security platform 230, using computing resource 235, processor 320, memory 330, and/or the like) may process the file to determine one or more file identification properties, as described above with regard to FIGS. 1A-1E.

As further shown in FIG. 4, process 400 may include obtaining metadata identifying user interactions associated with the file based on the one or more file identification properties, wherein the user interactions include at least one of: a first group of user interactions that were performed when the file was accessed on the first user device, or a second group of user interactions that were performed when the file was accessed on one or more other user devices (block 430). For example, the security platform (e.g., security platform 230, using computing resource 235, processor 320, memory 330, input component 350, communication interface 370, and/or the like) may obtain metadata identifying user interactions associated with the file based on the one or more file identification properties, as described above with regard to FIGS. 1A-1E. In some implementations, the user interactions may include at least one of: a first group of user interactions that were performed when the file was accessed on the first user device or a second group of user interactions that were performed when the file was accessed on one or more other user devices.

As further shown in FIG. 4, process 400 may include testing the file in a sandbox environment to obtain a result, wherein the one or more processors, when testing the file, are to: perform the user interactions that are identified by the metadata, and execute the malware detection procedure to determine whether the file is malware (block 440). For example, the security platform (e.g., security platform 230, using computing resource 235, processor 320, memory 330, input component 350, output component 360, communication interface 370, and/or the like) may test the file in a sandbox environment to obtain a result, as described above with regard to FIGS. 1A-1E. In some implementations, the security platform, when testing the file, may perform the user interactions that are identified by the metadata and may execute the malware detection procedure to determine whether the file is malware.

As further shown in FIG. 4, process 400 may include providing a notification that includes the result to the first user device to cause the first user device to perform one or more actions when the file is malware (block 450). For example, the security platform (e.g., security platform 230, using computing resource 235, processor 320, memory 330, output component 360, communication interface 370, and/or the like) may provide a notification that includes the result to the first user device to cause the first user device to perform one or more actions when the file is malware, as described above with regard to FIGS. 1A-1E.

Process 400 may include additional implementations, such as any single implementation or any combination of implementations described below and/or in connection with one or more other processes described elsewhere herein.

In some implementations, the metadata identifying the user interactions may include data identifying user interactions with one or more interface objects associated with the file. In some implementations, when processing the file, the security platform may process the file to determine at least one of: a file identifier that is to be used as a first file identification property or one or more other file identification properties that relate to one or more interface objects that are displayed after the file is accessed in the sandbox environment. In some implementations, when obtaining the metadata identifying the user interactions, the security platform may obtain the metadata identifying the user interactions by using the first file identification property or the one or more other file identification properties to search a data structure that associates particular metadata with particular file identification properties.

In some implementations, when testing the file in the sandbox environment, the security platform may execute the malware detection procedure to determine that the file is malware. In some implementations, the malware detection procedure may determine that the file is malware based on a defense mechanism of the malware incorrectly assessing the user interactions as being performed by a human user. In some implementations, when testing the file in the sandbox environment, the security platform may perform the user interactions identified by the metadata by interacting with one or more interface objects associated with the file using, or to simulate using, at least one of: a mouse, a keyboard, or a touch-screen. In some implementations, the file may be malware, and the security platform, when providing the notification, may provide, as part of the notification, a set of instructions indicating how to undo a set of modifications, on the first user device, caused by the malware.

In some implementations, the security platform may determine a likelihood of the user interactions triggering benign malware behavior of the file and may determine whether the likelihood of the user interactions triggering the benign malware behavior satisfies a threshold likelihood of the user interactions triggering the benign malware behavior. In some implementations, the security platform, when testing the file in the sandbox environment, may test the file in the sandbox environment by performing either the user interactions identified by the metadata or different user interactions identified by other metadata based on whether the likelihood of the user interactions triggering the benign malware behavior satisfy the threshold likelihood.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
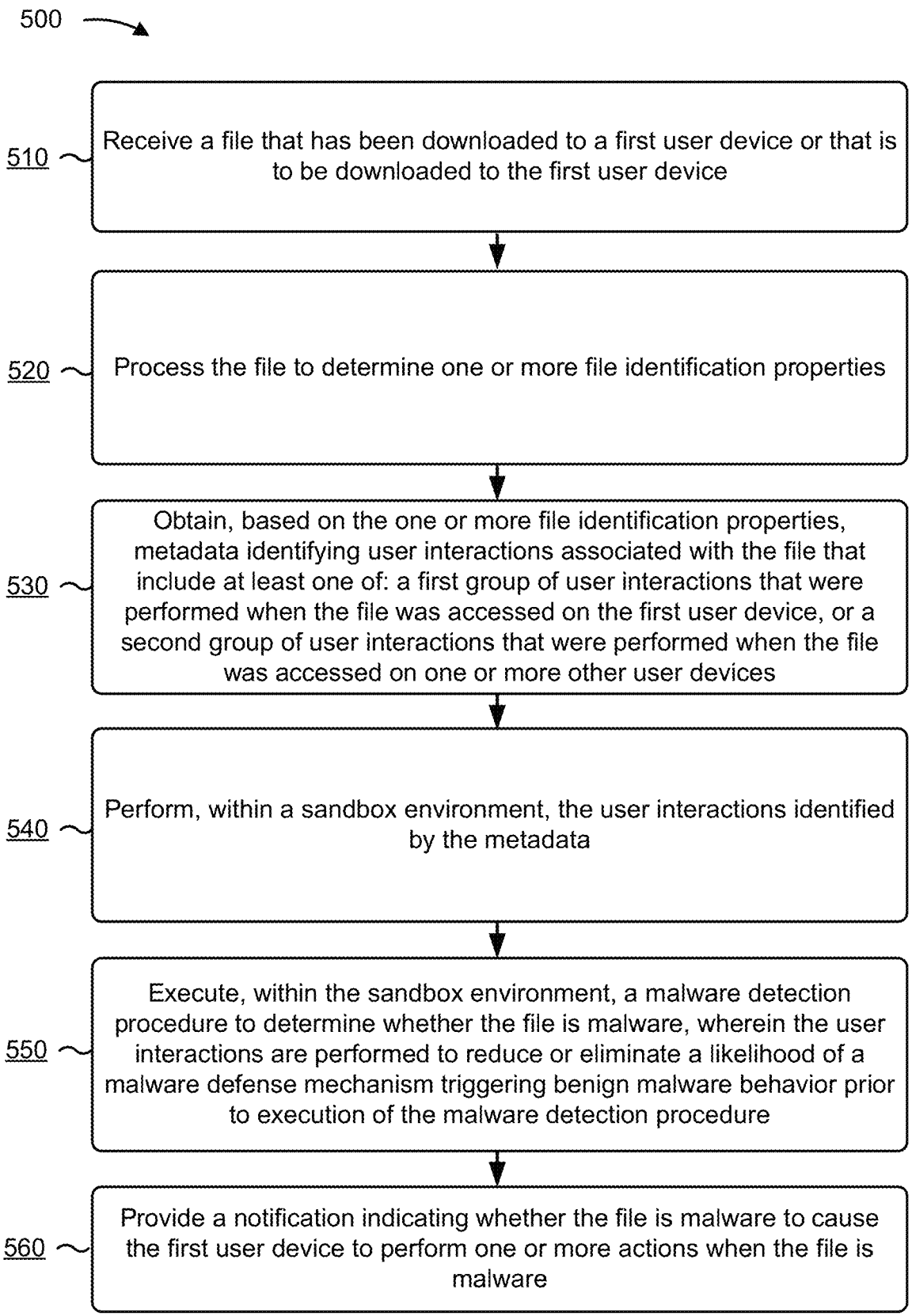

FIG. 5 is a flow chart of an example process 500 for detecting malware based on user interactions associated with processes of a file. In some implementations, one or more process blocks of FIG. 5 may be performed by a security platform (e.g., security platform 230). In some implementations, one or more process blocks of FIG. 5 may be performed by another device or a group of devices separate from or including the security platform, such as a user device (e.g., user device 210), a data storage (e.g., data storage 220), and/or a network device (e.g., network device 250).

As shown in FIG. 5, process 500 may include receiving a file that has been downloaded to a first user device or that is to be downloaded to the first user device (block 510). For example, the security platform (e.g., security platform 230, using computing resource 235, processor 320, memory 330, input component 350, communication interface 370, and/or the like) may receive a file that has been downloaded to a first user device or that is to be downloaded to the first user device, as described above with regard to FIGS. 1A-1E.

As further shown in FIG. 5, process 500 may include processing the file to determine one or more file identification properties (block 520). For example, the security platform (e.g., security platform 230, using computing resource 235, processor 320, memory 330, and/or the like) may process the file to determine one or more file identification properties, as described above with regard to FIGS. 1A-1E.

As further shown in FIG. 5, process 500 may include obtaining, based on the one or more file identification properties, metadata identifying user interactions associated with the file that include at least one of: a first group of user interactions that were performed when the file was accessed on the first user device, or a second group of user interactions that were performed when the file was accessed on one or more other user devices (block 530). For example, the security platform (e.g., security platform 230, using computing resource 235, processor 320, memory 330, input component 350, communication interface 370, and/or the like) may obtain, based on the one or more file identification properties, metadata identifying user interactions associated with the file that include at least one of: a first group of user interactions that were performed when the file was accessed on the first user device, or a second group of user interactions that were performed when the file was accessed on one or more other user devices, as described above with regard to FIGS. 1A-1E.

As further shown in FIG. 5, process 500 may include performing, within a sandbox environment, the user interactions identified by the metadata (block 540). For example, the security platform (e.g., security platform 230, using computing resource 235, processor 320, memory 330, input component 350, output component 360, communication interface 370, and/or the like) may perform, within a sandbox environment, the user interactions identified by the metadata, as described above with regard to FIGS. 1A-1E.

As further shown in FIG. 5, process 500 may include executing, within the sandbox environment, a malware detection procedure to determine whether the file is malware, wherein the user interactions are performed to reduce or eliminate a likelihood of a malware defense mechanism triggering benign malware behavior prior to execution of the malware detection procedure (block 550). For example, the security platform (e.g., security platform 230, using computing resource 235, processor 320, memory 330, and/or the like) may execute, within the sandbox environment, a malware detection procedure to determine whether the file is malware, as described above with regard to FIGS. 1A-1E. In some implementations, the user interactions may be performed to reduce or eliminate a likelihood of a malware defense mechanism triggering benign malware behavior prior to execution of the malware detection procedure. For example, the user interactions may be performed prior to the execution of the malware detection procedure. In some cases, it may be said that performance of the user interactions is included as part of the malware detection procedure.

As further shown in FIG. 5, process 500 may include providing, to the first user device, a notification indicating whether the file is malware to cause the first user device to perform one or more actions when the file is malware (block 560). For example, the security platform (e.g., security platform 230, using computing resource 235, processor 320, memory 330, output component 360, communication interface 370, and/or the like) may provide, to the first user device, a notification indicating whether the file is malware to cause the first user device to perform one or more actions when the file is malware, as described above with regard to FIGS. 1A-1E.

Process 500 may include additional implementations, such as any single implementation or any combination of implementations described below and/or in connection with one or more other processes described elsewhere herein.

In some implementations, the metadata identifying the user interactions may include data identifying user interactions with one or more interface objects associated with the file. In some implementations, the file may be malware, and the malware detection procedure may determine that the file is malware based on a defense mechanism of the malware incorrectly assessing the user interactions as being performed by a human user.

In some implementations, obtaining the metadata identifying the user interactions may include performing a search by using a first search query to search a data structure for the metadata identifying the user interactions, wherein the first search query includes a file identifier that is part of the one or more file identification properties. In some implementations, the security platform may receive, based on performing the search, a result indicating that the metadata identifying the user interactions was not found. In some implementations, the security platform may perform another search by using a second search query to search the data structure for the metadata identifying the user interactions. In some implementations, the second search query may include, as part of the one or more file identification properties, one or more interface object identifiers that are associated with one or more interface objects that are displayed when the file is accessed in the sandbox environment. In some implementations, the security platform may receive, based on performing the other search, another result that includes the metadata identifying the user interactions.

In some implementations, the file may be a first file and the malware detection procedure may determine that the first file is not malware. In some implementations, the security platform may receive a second file that has been downloaded to a second user device or that is to be downloaded to the second user device, may execute the malware detection procedure on the second file to determine that the second file is malware. In some implementations, the security platform may determine that a file identifier of the second file matches a particular file identifier of the first file, and may perform one or more actions to re-determine whether the first file is malware using new metadata identifying particular user interactions that were used to determine that the second file is malware.

In some implementations, the security platform may determine the likelihood of the user interactions causing the malware defense mechanism to exhibit benign malware behavior prior to execution of the malware detection procedure. In some implementations, the security platform may determine whether the likelihood satisfies a threshold likelihood of the user interactions causing the malware defense mechanism to exhibit the benign malware behavior. In some implementations, the security platform, when performing the user interactions, may perform either the user interactions identified by the metadata or different user interactions identified by other metadata based on whether the likelihood satisfies the threshold likelihood. In some implementations, the security platform may provide, as part of the notification, a set of instructions indicating to undo a set of modifications caused by the malware to the first user device. In some implementations, the set of instructions may cause the first user device to undo the set of modifications caused by the malware.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
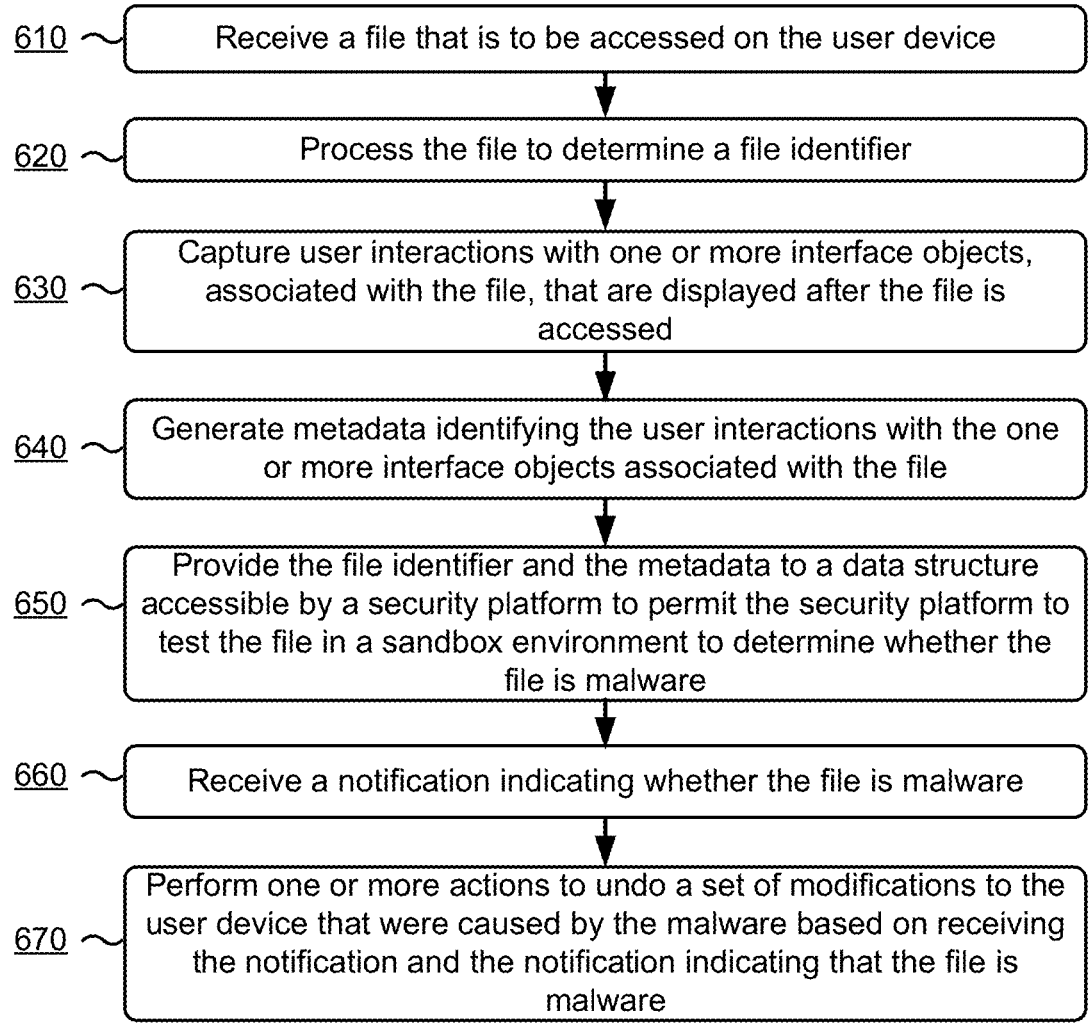

FIG. 6 is a flow chart of an example process 600 for detecting malware based on user interactions associated with processes of a file. In some implementations, one or more process blocks of FIG. 6 may be performed by a user device (e.g., user device 210). In some implementations, one or more process blocks of FIG. 6 may be performed by another device or a group of devices separate from or including the user device, such as a data storage (e.g., data storage 220), a security platform (e.g., security platform 230), and/or a network device (e.g., network device 250).

As shown in FIG. 6, process 600 may include receiving a file that is to be accessed on the user device (block 610). For example, the user device (e.g., user device 210, using processor 320, memory 330, input component 350, communication interface 370, and/or the like) may receive a file that is to be accessed on the user device, as described above with regard to FIGS. 1A-1E.

As further shown in FIG. 6, process 600 may include processing the file to determine a file identifier (block 620). For example, the user device (e.g., user device 210, using processor 320, memory 330, and/or the like) may process the file to determine a file identifier, as described above with regard to FIGS. 1A-1E.

As further shown in FIG. 6, process 600 may include capturing user interactions with one or more interface objects, associated with the file, that are displayed after the file is accessed (block 630). For example, the user device (e.g., user device 210, using processor 320, memory 330, input component 350, output component 360, communication interface 370, and/or the like) may capture user interactions with one or more interface objects, associated with the file, that are displayed after the file is accessed, as described above with regard to FIGS. 1A-1E.

As further shown in FIG. 6, process 600 may include generating metadata identifying the user interactions with the one or more interface objects associated with the file (block 640). For example, the user device (e.g., user device 210, using processor 320, memory 330, and/or the like) may generate metadata identifying the user interactions with the one or more interface objects associated with the file, as described above with regard to FIGS. 1A-1E.

As further shown in FIG. 6, process 600 may include providing the file identifier and the metadata to a data structure accessible by a security platform to permit the security platform to test the file in a sandbox environment to determine whether the file is malware (block 650). For example, the user device (e.g., user device 210, using processor 320, memory 330, output component 360, communication interface 370, and/or the like) may provide the file identifier and the metadata to a data structure accessible by a security platform (e.g., data storage 220 which may be accessible to security platform 230) to permit the security platform to test the file in a sandbox environment to determine whether the file is malware, as described above with regard to FIGS. 1A-1E.

As further shown in FIG. 6, process 600 may include receiving, from the security platform, a notification indicating whether the file is malware (block 660). For example, the user device (e.g., user device 210, using processor 320, memory 330, input component 350, communication interface 370, and/or the like) may receive, from the security platform, a notification indicating whether the file is malware, as described above with regard to FIGS. 1A-1E.

As further shown in FIG. 6, process 600 may include performing one or more actions to undo a set of modifications to the user device that were caused by the malware based on receiving the notification and the notification indicating that the file is malware (block 670). For example, the user device (e.g., user device 210, using processor 320, memory 330, input component 350, output component 360, communication interface 370, and/or the like) may perform one or more actions to undo a set of modifications to the user device that were caused by the malware based on receiving the notification and the notification indicating that the file is malware, as described above with regard to FIGS. 1A-1E.

Process 600 may include additional implementations, such as any single implementation or any combination of implementations described below and/or in connection with one or more other processes described elsewhere herein.

In some implementations, the file may be malware. In some implementations, providing the file identifier and the metadata to the data structure may permit the security platform to perform the user interactions in the sandbox environment and to use a malware detection procedure to determine that the file is malware based on a defense mechanism of the malware incorrectly assessing the user interactions as being performed by a human user. In some implementations, the user interactions may include at least one of: a mouse click to a first interface object of the one or more interface objects, a keyboard entry to input a value to a second interface object of the one or more interface objects, or a touch-screen interaction with a third interface object of the one or more interface objects.

In some implementations, the user device may capture display information for the one or more interface objects associated with the file and may generate additional metadata identifying the display information for the one or more interface objects associated with the file. In some implementations, when providing the file identifier and the metadata to the data structure, the user device may provide the additional metadata to the data structure to permit the security platform to use the additional metadata when determining whether the file is malware. In some implementations, the set of modifications may include at least one of: a first modification to change a register value, a second modification to open or close a port, a third modification to open or close a network connection, a fourth modification to add a new file or a new folder, or a fifth modification to modify an existing file or an existing folder.

In some implementations, when performing the one or more actions to undo the set of modifications, the user device may compare state information of the user device at a first time period occurring prior to accessing the file and state information at a second time period occurring after receiving the notification indicating that the file is malware. In some implementations, the user device may identify the set of modifications based on discrepancies identified while comparing the state information at the first time period and the state information at the second time period. In some implementations, the user device may undo the set of modifications that have been identified.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the security platform determines whether files are malware, despite the malware deploying defense mechanisms capable of detecting whether the malware is being accessed by a human user or a sandbox environment. By preventing or reducing malware attacks on devices within a network, the security platform reduces a utilization of processing resources of devices targeted by malware (e.g., resources that may be used to perform unauthorized actions, receive unauthorized data, store unauthorized data, transmit unauthorized data, and/or the like). This improves overall performance of the devices by freeing up resources that might otherwise be used to perform unauthorized actions dictated by the malware. Furthermore, by detecting the malware, the security platform conserves processing resources and/or network resources that would otherwise be used to perform actions needed to undo modifications caused by the malware.

Additionally, the user device captures user interactions needed to determine whether the file is malware, thereby preventing or reducing malware attacks on the user device. This reduces a utilization of processing resources of the user device that might otherwise be expended performing unauthorized actions, receiving unauthorized data, storing unauthorized data, transmitting unauthorized data, and/or the like. Furthermore, by tracking state information, the user device is able to undo the set of modifications made by the malware. This reduces a utilization of resources that was previously being used to support malware-related actions, improves user device performance by freeing up resources for authorized tasks, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   obtaining, by a device, metadata associated with a file,
      wherein the metadata is generated by a user device using an image capturing technique to capture user interactions with a set of interface objects associated with the file;
   testing, by the device, the file in a sandbox environment to obtain a result based on simulating the user interactions that are identified by the metadata; and
   providing, by the device and to the user device, information indicating whether the file is malware based on the testing.

2. The method of claim 1, wherein the user interactions include at least one of:
   a first group of user interactions that were performed when the file was accessed on the user device, or
   a second group of user interactions that were performed when the file was accessed on one or more other user devices.

3. The method of claim 1, wherein testing the file in the sandbox environment comprises:
   performing the user interactions that are identified by the metadata; and
   executing, based on performing the user interactions, a malware detection procedure to determine whether the file is malware.

4. The method of claim 1, wherein testing the file in the sandbox environment comprises:
   performing the user interactions identified by the metadata by interacting with one or more of the set of interface objects associated with the file using at least one of:
   a mouse,
   a keyboard, or
   a touch-screen.

5. The method of claim 1, wherein providing the information comprises:
  providing, as part of the information, a set of instructions to cause the user device to undo a set of modifications caused by the file.

6. The method of claim 1, wherein the user interactions are performed to reduce or eliminate a likelihood of a malware defense mechanism triggering benign malware behavior prior to execution of a malware detection procedure.

7. The method of claim 1, wherein execution of information in the file triggers a display of the set of interface objects.

8. A device comprising:
  one or more memories; and
  one or more processors, operatively connected to the one or more memories, to:
    obtain metadata associated with a file,
      wherein the metadata is generated by a user device using an image capturing technique to capture user interactions with a set of interface objects associated with the file, and
      wherein the metadata identifies the user interactions;
    test the file to obtain a result based on simulating the user interactions that are identified by the metadata; and
    provide, to the user device, information indicating whether the file is malware based on the result.

9. The device of claim 8, wherein the user interactions include at least one of:
  a first group of user interactions that were performed when the file was accessed on the user device, or
  a second group of user interactions that were performed when the file was accessed on one or more other user devices.

10. The device of claim 8, wherein the one or more processors, when testing the file, are to:
  perform the user interactions that are identified by the metadata; and
  execute, based on performing the user interactions, a malware detection procedure to determine whether the file is malware.

11. The device of claim 8, wherein the one or more processors are further to:
  provide, as part of the information, a set of instructions to cause the user device to one or more of:
    change a register value,
    open or close a port,
    open or close a network connection,
    add a new file or a new folder, or
    modify an existing file or an existing folder.

12. The device of claim 8, wherein the one or more processors are further to:
  provide, as part of the information, a set of instructions to cause the user device to undo a set of modifications.

13. The device of claim 8, wherein the user interactions are performed to reduce or eliminate a likelihood of a malware defense mechanism triggering benign malware behavior prior to execution of a malware detection procedure.

14. The device of claim 8, wherein the set of interface objects includes at least a dialogue box.

15. A non-transitory computer-readable medium storing instructions, the instructions comprising:
  one or more instructions that, when executed by one or more processors of a device, cause the one or more processors to:
    obtain metadata associated with a file,
      wherein the metadata is generated by a user device using an image capturing technique to capture user interactions with a set of interface objects associated with the file;
    execute the file in a sandbox environment to obtain a result based on simulating the user interactions that are identified by the metadata; and
    provide, to the user device, information indicating whether the file is malware based on the result.

16. The non-transitory computer-readable medium of claim 15, wherein the user interactions include at least one of:
  a first group of user interactions that were performed when the file was accessed on the user device, or
  a second group of user interactions that were performed when the file was accessed on one or more other user devices.

17. The non-transitory computer-readable medium of claim 15, wherein the one or more instructions, that cause the one or more processors to test the file in the sandbox environment, cause the one or more processors to:
  perform the user interactions that are identified by the metadata; and
  execute, based on performing the user interactions, a malware detection procedure to determine whether the file is malware.

18. The non-transitory computer-readable medium of claim 15, wherein the one or more instructions, that cause the one or more processors to test the file in the sandbox environment, cause the one or more processors to:
  perform the user interactions identified by the metadata by interacting with one or more of the set of interface objects associated with the file to simulate using a touch-screen.

19. The non-transitory computer-readable medium of claim 15, wherein the one or more instructions, that cause the one or more processors to provide the information, cause the one or more processors to:
  provide, as part of the information, a set of instructions to cause the user device to undo a set of modifications made to the user device.

20. The non-transitory computer-readable medium of claim 15, wherein the user interactions are performed to reduce or eliminate a likelihood of a malware defense mechanism triggering benign malware behavior prior to execution of a malware detection procedure.

* * * * *